(12) United States Patent
Rea

(10) Patent No.: US 11,338,761 B2
(45) Date of Patent: May 24, 2022

(54) GAS GENERATOR WITH THROTTLE MEMBER

(71) Applicants: Key Safety Systems, Inc., Sterling Heights, MI (US); Sergio Rea, Colleferro RM (IT)

(72) Inventor: Sergio Rea, Colleferro RM (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 103 days.

(21) Appl. No.: 16/098,965

(22) PCT Filed: Aug. 8, 2018

(86) PCT No.: PCT/IB2018/055970
§ 371 (c)(1),
(2) Date: Nov. 5, 2018

(87) PCT Pub. No.: WO2019/030693
PCT Pub. Date: Feb. 14, 2019

(65) Prior Publication Data
US 2021/0221325 A1 Jul. 22, 2021

(30) Foreign Application Priority Data

Aug. 8, 2017 (IT) .......... 102017000091561

(51) Int. Cl.
*B60R 21/268* (2011.01)
*B60R 21/26* (2011.01)

(52) U.S. Cl.
CPC .. *B60R 21/268* (2013.01); *B60R 2021/26094* (2013.01)

(58) Field of Classification Search
CPC ........ B60R 2021/26094; B60R 21/268; B60R 21/26; B60R 21/276; B60R 2021/2765
USPC ....................................................... 102/530
See application file for complete search history.

(56) References Cited

U.S. PATENT DOCUMENTS

| 5,489,117 A | 2/1996 | Huber |
| 5,743,558 A | 4/1998 | Seymour |
| 6,062,598 A * | 5/2000 | Faigle .................... B60R 21/26 |
| | | 280/736 |
| 6,655,712 B1 | 12/2003 | Larsen et al. |

(Continued)

FOREIGN PATENT DOCUMENTS

| CN | 102216127 A | 4/2014 |
| DE | 19526547 A1 | 1/1996 |

(Continued)

OTHER PUBLICATIONS

Office Action in German Application No. 11 2018 004 051.8. dated Nov. 29, 2021. 21 pages.

(Continued)

*Primary Examiner* — Paul N Dickson
*Assistant Examiner* — Caitlin Anne Miller
(74) *Attorney, Agent, or Firm* — Meunier Carlin & Curfman LLC

(57) ABSTRACT

Gas generator including means to provide a pressurized gas, a gas exit portion and a throttle member located in said gas exit portion, having one or more openings for the passage of said gas and being deformable by a gas flowing through said throttle when the pressure of said gas is above a predetermined pressure, to prevent or reduce gas flow.

13 Claims, 6 Drawing Sheets

(56) References Cited

U.S. PATENT DOCUMENTS

| | | |
|---|---|---|
| 2003/0209894 A1 | 11/2003 | Larsen et al. |
| 2006/0131855 A1 | 6/2006 | Kreuzer |
| 2006/0290120 A1 | 12/2006 | Zeng et al. |
| 2007/0138775 A1 | 6/2007 | Rossbach et al. |

FOREIGN PATENT DOCUMENTS

| | | | | |
|---|---|---|---|---|
| DE | 202004019448 U1 | 4/2006 | | |
| GB | 2291495 A | * 1/1996 | ............. | B60R 21/26 |
| WO | 2010058251 | 5/2010 | | |
| WO | WO-2010058251 A | * 5/2010 | ........... | B60R 21/268 |

OTHER PUBLICATIONS

Office Action in Chinese Application No. 201880065656.8. dated Oct. 9, 2021. 15 pages.

\* cited by examiner

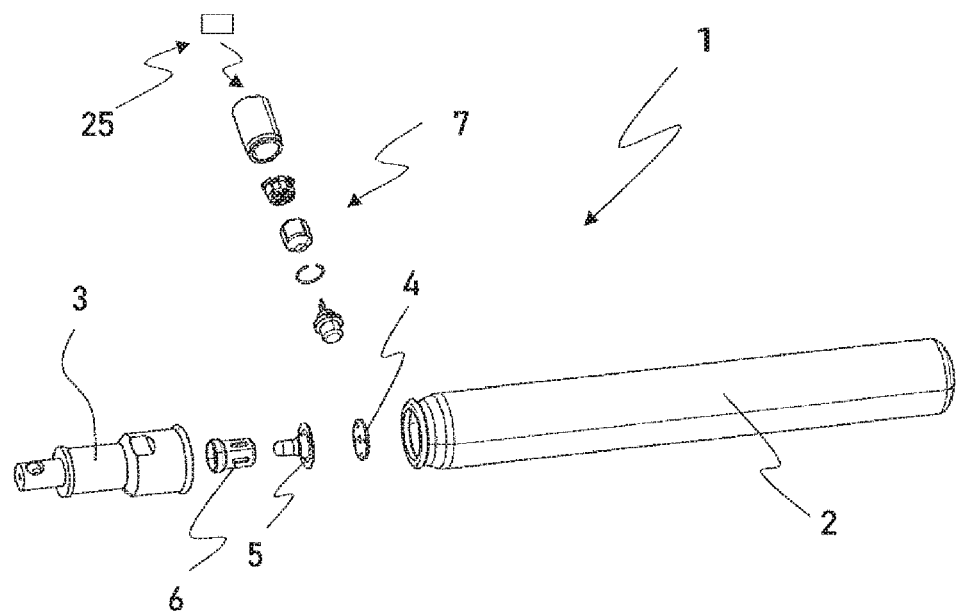
FIG. 1
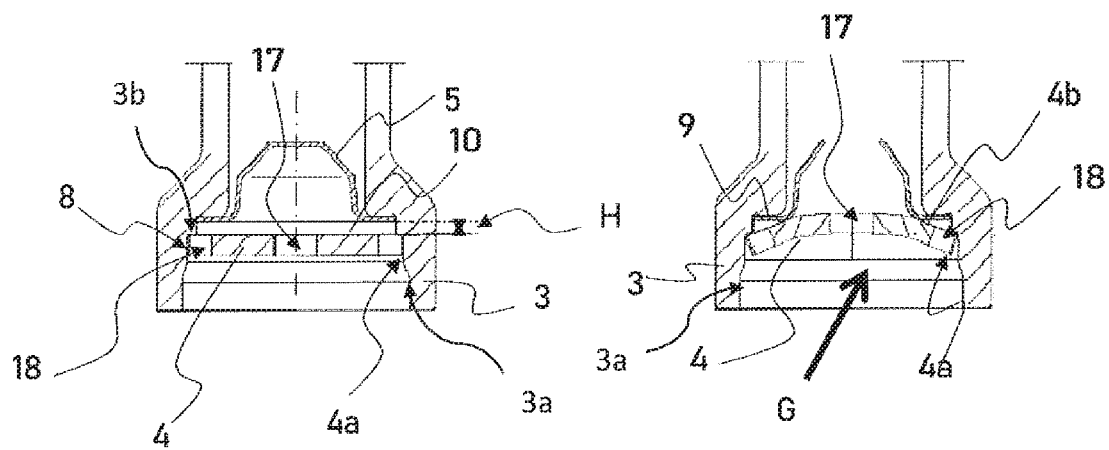
FIG. 3A
FIG. 3B

GAS GENERATOR WITH THROTTLE MEMBER

FIELD OF THE INVENTION

The present invention relates to gas generator having a throttle valve. The invention relates in particular to a gas generator with a throttle valve which is an inflator for an airbag that can generate in a very short time a flow of gas at high pressure and in which the flow rate of the gas might have to be reduced during e.g. the first 15-40 milliseconds of generation. Examples of gas generators are inflators in motor vehicle restraint systems, such as in airbags, in particular curtain airbags, and e.g. inflators for inflatable seat belts.

BACKGROUND OF THE INVENTION

Inflators for airbags have to release large volumes of gas in a very short time (often only a few milliseconds) to inflate an airbag after a vehicle crash has been sensed. Airbag inflators are often characterized as cold gas inflators and hybrid inflators. A cold gas inflator contains compressed gas which is released from a storage container by a pyrotechnic device. The hybrid inflator (or hybrid gas inflator) will also include compressed gas in a storage container and, additionally, a quantity of propellant that heats the compressed gas as it leaves the storage container. The pressure of the gas generated by the inflator, especially in the case of compressed gas inflators and hybrid inflators, is sensitive to environmental conditions and to temperature in particular.

Pressure profile curves and gas flow rate curves change with temperature, so that pressure profiles and gas flow rates at cold temperatures (i.e. at about −35° C.) and up to ambient temperature, i.e. about 23° C. are different to profiles and rates at higher temperatures, i.e. up to 90° C. As a result, an airbag can be inflated more rapidly when the inflator has been stored at high temperature than when an inflator is stored at low temperature.

There have been several proposals to solve the problem of changes in the performance of an airbag inflator at different temperatures of the gas in the inflator. It was proposed to use valves to vent part of the gas to the atmosphere, to use rotating valves or sliding valves, such as in U.S. Pat. Nos. 5,489,117 or 5,743,558. Other solutions involved an element made of a shape memory alloy (U.S. Pat. No. 6,655,712) which acts to reduce the fluid flow area at high temperatures and a variable throttle member for the gas flow from the inflator.

The latter solution is disclosed in US2007/0138775; it provides for a throttle member that includes at least one tab being inclined towards the inflator to allow gas flow from the inflator to the airbag through a first flow area. When the gas pressure reaches a predetermined value, the tab is bent into the remaining part of the throttle to reduce the passage available in the throttle for the gas flow from the inflator. The use of a throttle with variable passage area for the flow of gas coming from the inflator, results in a pressure profile of the hot stored gases that is closer to the pressure profile of ambient temperature.

The problem with the above discussed solutions is that they make use of special materials and/or they request a complex structure. This may result in turn in performances not always repeatable and in a possible malfunction of the throttles or valves used with the inflator.

It is an aim of the present invention to solve the above problems and to provide an inflator having a variable gas flow throttle acting as a valve to control the pressure profiles of gas at different temperatures in a range that is e.g. from −35° C. to +90° C. The throttle valve should be easily produced, economical, structurally simple and should be very reliable in operation.

The throttle valve should also be free from tabs. As above discussed with reference to US2007/0138775, tabs or similar elements have to be bent during operation at high temperatures to reduce the flow area for the gas, while the remaining part of the throttle member maintains its original flat shape. In the present invention, the entire throttle is deformed to some extent, the deformation being usually greater in the central part of the throttle member.

SUMMARY OF THE INVENTION

The above aim is reached by means of the present invention that relates to gas generator according to claim 1. In greater detail, the invention provides a gas generator with a throttle valve, said throttle valve being located in an exit duct of said gas generator, said throttle valve comprising a throttle member, a housing for a portion of said throttle member, wherein the throttle member comprises at least one opening, which is preferably a central opening. Generally, the throttle member is a sheet of a metal material. The throttle member is deformable by the action of the pressurized gas flow. Depending on the pressure of the gas flow, the throttle member may be deformed from a first position in which gas can flow through said (central) opening of the member and a second position in which at least a part of said (central) opening is blocked by means of an adjacent inflator structure and gas flow through said opening is prevented or at least reduced. As above mentioned, the pressure of the gas is sensitive to environmental conditions and to temperature in particular.

Thus, the invention provides a gas generator comprising a new deformable throttle member which includes at least one opening, and which can be deformed by the pressure of the gas flowing through the inflator outlet duct into a position in which part of said one or more openings is at least partially blocked to reduce the gas flow rate through the deformed throttle member in order to control the pressure downstream of the throttle (with respect to the direction of the gas flow). The throttle may e.g. be at least partially blocked by an adjacent abutment member. In one embodiment, the throttle member is plastically deformable; in another embodiment the throttle member is flexible. In an embodiment, the throttle member may have a centre opening and further openings located near the edge of the throttle member. As the deformable throttle member can bend, the amount of gas flow passing through the throttle member can be reduced as one or more of the openings, preferably the edge-openings, are blocked, either directly or indirectly, either in part or totally, e.g. by their deformation and/or by at least one adjacent abutment member of the gas generator structure.

In an embodiment, the gas generator is an inflator, particularly for an airbag; in the following description reference will be made to a gas generator which is an inflator for an airbag, however this is not to be intended as a limitation of the device which includes a throttle member as depicted, to an inflator for airbag. The throttle member may be part of a throttle valve.

DESCRIPTION OF THE INVENTION

The throttle member of the invention provides several advantages over the prior art. In fact, the throttle member of the invention allows reducing the gas pressure ramp in the cushion of an airbag at "hot" temperature deployment and minimizing the difference vs. ramp slopes at ambient or cold temperatures. This is to reduce the stress on the cushion and the other parts of the airbag module involved in the deployment for a more robust and cheaper product design. Same benefit would be applicable for other components of the vehicle influenced by the module deployment, like trim parts and grab handles for curtain airbag. Furthermore, the throttle member can be easily used on cold gas inflators, hybrid inflators, depending by the design concept, and it would be also possible to use it on pyro-devices specifically developed for this application.

The variable gas flow throttle member or valve comprises at least one opening, preferably more than two openings i.e. passages for a flow of gas coming from the gas generator. In an embodiment, the throttle member has a centrally located opening and two or more laterally, i.e. peripherally, located additional openings. In the present invention the throttle member is made from a material that can deform under the pressure P of the gas exiting the gas generator when pressure P is higher than a certain value. Generally the throttle member is not deformed when the pressure of the gas is the gas pressure in the inflator at cold temperature and may be slightly deformed when the pressure of the gas is the pressure when the inflator is at room temperature; this deformation does not change the inflator performances.

When the gas is at a pressure higher than the gas pressure in the inflator at cold or ambient temperature, and the inflator is activated, pressurised gas at pressure P or above pressure P flows from the pressurised vessel of the inflator and deforms the throttle member under the driving force of the pressurised gas. If the pressure is sufficiently high, the throttle member is deformed to such an extent that it contacts an abutment member of the adjacent inflator structure and the gas flow through at least one of the openings of the throttle member is reduced or stopped, i.e. prevented.

In an embodiment, there is a central opening that is always open and at least one further opening, which may be a plurality of peripheral openings, i.e. side openings that are directly or indirectly closed. The number of the peripheral openings is preferably two but more preferably, there are four side openings in the throttle member. At least some of the peripheral openings become blocked or obstructed when the throttle member is deformed into its second position, so that the gas flow through those openings is stopped or reduced. In another embodiment, the central opening becomes blocked in full or in part, while the peripheral openings remain unobstructed and provide the required passages for the flow of pressurized gas. In a further embodiment, there is no abutment element; the at least one opening is deformed together with the throttle member to reduce its inlet area and consequently the flow of gas through the opening or openings.

The shape of the openings of the throttle member is not limited and the same throttle member may have differently shaped openings. By way of example these openings may include geometric shapes composed of curved (circular arcs) and straight line segments. In particular the following geometric shapes are here exemplified: circular, oval, oblong, ellipse, crescent, stadium, etc. These geometric shapes may include both regular and irregular forms circular shapes are preferred. Independently from the shape of the peripheral openings, in a throttle member the total area of passages that is free to allow a gas flow is preferably greater than the total area of passages through which gas flow is stopped or blocked. Thus, the ratio between the opening area that remains open also when the throttle member has been deformed (e.g. the area of the central opening) to the total area of the openings that are blocked upon deformation of the throttle member (e.g. the peripheral or side openings), is 1.0 or higher; preferably, said ratio is comprised in the range from 35/65 to 45/55, preferably 40/60 to 45/55.

The variable gas flow throttle member may be in the form of a disc of any geometrical shape, preferably a circular disc. It can be made of a sheet of a material that is resistant to the high temperatures (e.g. it does not melt) of the gas from the inflator and is able to deform under the flow of gas at a pressure above a predetermined value; as mentioned, the deformation may increase with the increase of the pressure of the inflator gas. According to embodiments of the invention, the throttle plastically deforms and remains in this condition after the deployment is completed. Examples for such a material are: a metal material, such as a steel alloy, e.g. $FePO_2$, stainless steel, nickel alloys, such as nickel-chromium alloys, e.g. those sold with the brand name INCONEL®, and nickel-copper alloys, e.g. those sold with the brand name MONEL®.

The throttle member of the inflator of the present invention may have a thickness comprised between 0.5 and 4 mm, depending on the material used and the maximum pressure of the gas. In particular, the thickness of the throttle member depends on the internal pressure used in the pressure vessel of the inflator and on the mechanical properties of the material used for the preparation of the throttle member. The thickness for the above mentioned metal materials is preferably in the range of 1.5 to 3.0 mm, most preferably 1.85 to 2.5 mm.

The exit portion of the inflator of the invention may include a duct; the exit portion or the duct portion comprises an abutment member for interaction with the deformed throttle member, and a housing (e.g. a shoulder or step of the wall of the exit portion) for accommodating therein the throttle member in a manner that at least the periphery edge of the downstream surface of the variable gas flow throttle member is supported in said housing (e.g. a shoulder) while the downstream surface of the throttle member is spaced apart from said abutment member of the exit duct portion. As stated before, in an embodiment the throttle member is normally (before being deformed) flat, e.g. it is a part obtained from a metal sheet; the edge or periphery of the throttle is supported by a housing that is provided in the exit duct of the inflator, i.e. in the inflator's structure; a suitable housing is a shoulder, or step, provided in the wall of the duct-exit portion, namely on the wall internal surface of the exit duct. The throttle member is able to deform, usually plastically, from a first position, in which the throttle member is flat and gas from the inflator can flow through central and peripheral openings of the throttle member, into a second position, into which the throttle has been deformed by the gas. In the second position the downstream surface of the throttle (i.e. the surface downstream with respect to the flow of gas) is in contact with or very close to an abutment member; in this condition at least a part of the central or of the side openings are substantially blocked, directly or indirectly, and gas flow through them is prevented, i.e. stopped, or reduced. The deformation of the throttle member may occur in different degrees according to the pressure P of the gas flow, which depends on the temperature. Thus, different deformations of the throttle member may occur at different temperatures of the gas, the higher being the temperature the greater being the deformation. A deformation may start to occur at or just above the ambient temperature.

The abutment member is located downstream of the throttle member, it may be e.g. a step or similar portion protruding from, or provided at, the structure of the exit portion of the inflator; another suitable abutment member may be a disc provided with wide openings, i.e. openings that provide unhindered passage of the gas fed from the inflator to the cushion of the airbag. The body portions of the abutment disc, i.e. the portions that are "full", provide an abutment for one or more openings of the throttle, usually for the centrally located opening. In particular, the throttle member deforms under the driving force of the pressurized gas exiting the pressure vessel of the inflator towards the abutment shoulder of the exit duct of the inflator wherein a peripheral area of the downstream surface of the throttle member comes close or into contact with the abutment shoulder in a manner that the gas flow through the side openings is obstructed or blocked. When the abutment element is the above discussed disc, and the throttle member is deformed by the pressurized gas, the downstream surface of the throttle member comes close or into contact with the disc body; in particular the disc body may block the central opening of the throttle member.

In the first position, i.e. a not deformed position, the downstream surface of the throttle member is spaced from the upstream surface of the abutment member of the exit duct by a predetermined distance. Exemplary distance is in the range of 0.8 to 3.8 mm, preferably 1.0 to 3.0 mm; this distance applies for the shoulder abutment and for the disc abutment as well. Preferably, the central and other openings of the throttle member have a predetermined diameter in function of said distance.

In case of deployment at high temperatures, such as 80-90° C., the gas pressure in the pressure vessel of the inflator is so high that it is able to generate a throttle member deformation in such a manner that the throttle member contacts the bottom shoulder minimizing or blocking thereby the gas flow through the side openings. Therefore, in that case, during deployment of an airbag, the pressurised gas will be able to pass only through the central opening of the throttle member, such a restriction resulting in a reduction of the total gas flow mass exiting the pressure vessel of the inflator and entering the airbag. As visible from the following drawings, a portion of the throttle member, usually its outer edge or periphery remains substantially located in its housing. The remaining part of the deformed throttle member, i.e. that part of the throttle member which is not located in the housing (or shoulder) of the exit duct, is moved towards the abutment member or other part of the inflator structure, so as to block the peripheral or central openings by contacting a portion of the deformed part of the throttle member with the abutment member shoulder or other abutment element of the inflator's structure.

In an embodiment of the invention shown in FIGS. 1-3b, the abutment element is a part of the structure of the inflator, namely a shoulder or step, which is contacted (or substantially contacted) by the part of the throttle member that is free from openings (i.e. gas passageways) when the throttle is in the deformed condition. In this embodiment, see FIGS. 3a and 3b, the peripheral openings are not directly blocked, but the gas flow through them is restricted and stopped, to provide a closure of the openings that are at the periphery of the throttle member.

In another possible embodiment, as previously discussed, the abutment member is a disc transversally located in the exit duct downstream of the throttle member with respect to the gas flow in the inflator. This disc is preferably made from a hard or semi-hard material i.e. a material that does not deform in the working conditions of the inflator, and partially obstructs the gas-flow passageway from the inflator. The disc according to this embodiment has a cross-sectional view with void spaces (openings) around a closed/filled central area having a central axis corresponding to that one of the central opening of the throttle member.

The abutment disc member may have a three-dimensional shape, wherein the closed or filled central area may protrude from the plane of the abutment member, provided that the shape of said central area of the abutment member will be able to at least partially block or obstruct the gas flow through the central opening of the throttle member, while allowing gas flow through the side openings of the throttle member. Some illustrative but not limiting examples of the three-dimensional shape of the abutment member according to the present invention are shown in FIGS. 7(a)-7(i). Accordingly, the abutment member has a three-dimensional shape and comprises void spaces (openings) on its surface as well as a closed or filled central areas projecting towards the central opening of the throttle member. The shape of such an abutment member may be conical, curved (or arched) or their combinations with differently shaped protruding central areas as shown in FIGS. 7(a)-7(i).

In operation, when the inflator is activated, the throttle member deforms under the driving force of the pressurized gas; usually, the deformed throttle member has a shape that is concave with respect to the gas flow direction, i.e. a concavity is present on the upstream side of the throttle member. The deformation of the throttle member may occur in different degrees (e.g. an increasing concavity) according to the pressure P of the gas flow, which in turn depends also on the temperature. Thus, different deformations may occur at different temperatures of the gas, the higher being the temperature the greater being the deformation. In a fully deformed condition, the central area of the throttle member, comprising a central opening, contacts the central area of the abutment member located in the exit duct of the inflator downstream of said throttle member causing thereby the reduction or the blocking of the gas flow through the central opening of the throttle member. Consequently, the gas can flow from the pressure vessel of the inflator only through the void spaces (openings) of the abutment member and the side openings of the throttle member, thus the flow rate of the pressurized gas exiting the inflator is reduced in case the pressure of the gas within the vessel is high enough to be able to deform the throttle member.

The term "hard or semi-hard material" in the context of the present invention indicates a material that is substantially not deformable under the gas pressure and flow acting on its surface, while the term "closed or filled" refers to an area without any voids or openings.

The invention also provides the advantage that the following parameters of the throttle member and the abutment member of the inflator can be designed and tailored to obtain the fine tuning of the throttle valve performances: throttle member material, throttle member thickness, the diameter of the central opening of the throttle member, the number and the diameter of the side openings of the throttle member, the distance from the throttle member to the bottom shoulder or abutment disc and the diameter and shape of the shoulder or of the disc.

A selection of these variable parameters in function of the desired effect allows determining the pressure slope in the airbag cushion and minimizing the different outputs at hot temperature vs. ambient temperature of the pressurised gas. In addition, these variable parameters allow finding the right compromise for the throttle valve to minimize its influence at cold and ambient temperatures, while permitting a consistent delay of the gas flow at hot temperatures from the pressure vessel of the inflator

BRIEF DESCRIPTION OF THE DRAWINGS

The invention will now be described in a non-limiting way with reference to the accompanying drawings, in which:

FIG. 1 is a perspective view of a pressurized gas inflator according to the invention.

FIGS. 3A and 3B are enlarged fragmentary longitudinal sectional views, before and after deformation of a throttle member, in a portion of the exit duct of the inflator according to a possible embodiment of the present invention.

DETAILED DESCRIPTION OF THE INVENTION

Figure 2:
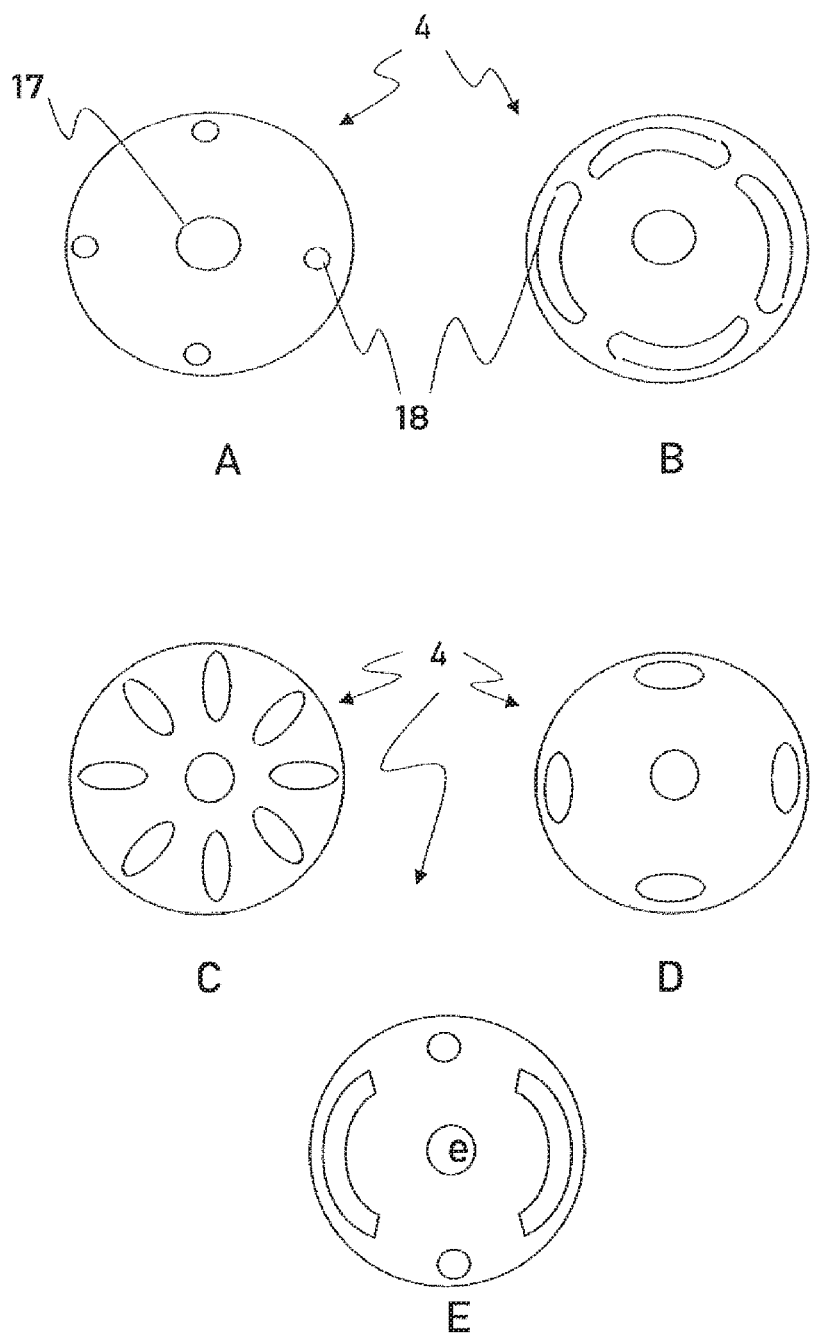
FIG. 2 is a cross-sectional view of some possible embodiments of the throttle member of the invention.

FIG. 1 shows an inflator 1 according to the present invention for inflating an airbag. With reference to FIG. 1 and FIGS. 3A, 3B the inflator 1 comprises a means of providing a pressurized gas, that in this embodiment is a vessel 2 for storing compressed gas; the inflator also comprises an exit duct 3, a throttle member 4 having a circular shape with a central opening 17 and four peripheral or side openings 18, a blocking element 5 for blocking the exit of the compressed gas from the vessel 2, an inflation head 6 and a triggering mechanism 7. The throttle member 4 is located upstream of the blocking element 5 with respect to the flow of gas G and its peripheral edge 4a is supported in a housing 8 provided in the wall of the exit duct 3, i.e. on the internal surface of the wall 3a as shown in FIG. 3. A preferred housing for the edge 4a of throttle member 4 is, in a general way, a shoulder (or step) 3b provided on the internal side of wall 3a.

Figure 6:
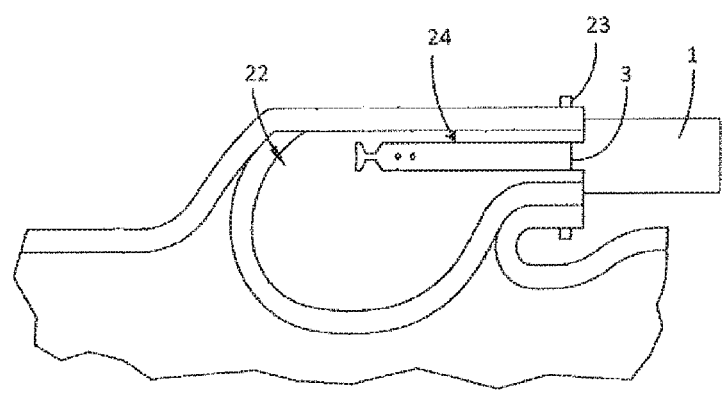
FIG. 6 is a schematic representation of the inflator of the present invention as part of a motor vehicle restraint system in combination with a curtain airbag.

When the inflator is actuated by a signal sent to the triggering mechanism 7 by a crash sensor 25, the triggering mechanism 7 displaces or ruptures the blocking element 5 thereby opening the inside of the vessel 2 to allow the pressurised gas to exit from the vessel 2 into the airbag 22. An inflator 1 according to the present invention is shown in FIG. 6 as part of a vehicle restraint system wherein the inflator 1 is connected to a curtain airbag 22 secured to the vehicle by means of a clamp 23. In particular, the gas exit duct 3 of the inflator 1 is connected to the curtain airbag 22, i.e. to an inflatable volume of the curtain airbag 22, through a fill tube 24.

FIG. 2 shows some possible embodiments for the shapes, location and distribution of the openings in the variable gas flow throttle member 4. Accordingly, the openings may have different dimensions as well as regular and irregular geometrical shapes including circular, oblong, ellipse, stadium and crescent forms. Independently from the shape of the peripheral and central openings, the ratio between the opening area that remains open also when the throttle has been deformed (e.g. the area of the central opening) to the total area of the openings that are blocked, i.e. through which the gas flow is stopped upon deformation of the throttle member (e.g. the peripheral—side openings), is comprised in the range from 35/65 to 45/55, preferably 40/60 to 45/55.

According to the embodiment shown in FIG. 3, the flow rate of the compressed gas exiting the vessel 2 through the openings of throttle member 4 is controlled by means of the plastic deformation of said throttle member 4, i.e. by means of closing or partially obstructing the flow through the side openings by contacting throttle 4 with the surface of the bottom shoulder 9 acting as an abutment member in the exit duct 3, as shown in FIG. 3B.

The deformation of throttle member 4 is a function of the pressure of the gas coming from the vessel 2. Therefore, in order to achieve a suitable deformation of throttle member 4 in the exit duct 3 to contact the bottom shoulder surface 9 (i.e. the abutment member), it is advantageous to properly select the material and the thickness of throttle member 4 in relationship with the distance between the upper surface of throttle member 4 and the surface of the bottom shoulder 9. The throttle member of the inflator of the present invention may have a thickness comprised between 0.5 and 4 mm. In particular, the thickness of throttle member 4 depends on the internal pressure used in the pressure vessel 2 of the inflator 1 and on the mechanical properties of the material used for the preparation of throttle member 4. Examples for such a material are: a metal material, such as a steel alloy, e.g. $FePO_2$, stainless steel, nickel alloy, nickel-chromium alloys such as those sold with brand name INCONEL®, and nickel-copper alloys, such as those sold with brand name MONEL®. The thickness for the above mentioned metal materials is preferably in the range of 0.5 to 4.0 mm, preferably 1.5 to 2.5 mm, most preferably 1.85 to 2.0 mm. For these materials and thicknesses, a suitable distance between upper surface 10 of throttle member 4 and the shoulder 9 is in the range of 1.0 to 4.0 mm.

With reference to FIGS. 3A and 3B and their enlarged sectional view of the exit duct 3 of the inflator 1, throttle member 4 is provided in a housing 8 of the exit duct 3, the throttle member housing is a shoulder 3b located on the inside surface of wall 3a, upstream of both the abutment shoulder 9 and the blocking element 5. The upper, i.e. downstream, surface 4b of throttle member 4 is spaced from the upstream (with respect to the direction of gas flow G) surface of the bottom shoulder 9 at such a distance H to allow the deformation of throttle member 4 towards the surface of the shoulder 9. This distance H should be such as to allow surface 4b of throttle member 4 to contact the surface of the bottom shoulder 9 during the deformation of throttle member 4 when the gas pressure has reached a predetermined value. In this manner, the flow through the side openings 18 of the throttle member will be at least partially blocked or reduced, which results in a reduced amount of pressurized gas exiting the pressure vessel 2 of the inflator 1. In other words, the gas flow through the passageway areas 17, 18 will be reduced by deformation of throttle member 4. This effect of creating a reduced gas flow by the inflator of the present invention is more significant in case of gas stored at high temperatures, such as at a temperature ranging from 60° C. to 90° C., where the pressure of the gas is higher than that of a gas stored at ambient temperature or a cold gas and, consequently, the deformation of the throttle member is more significant.

Figures 5A, 5B:
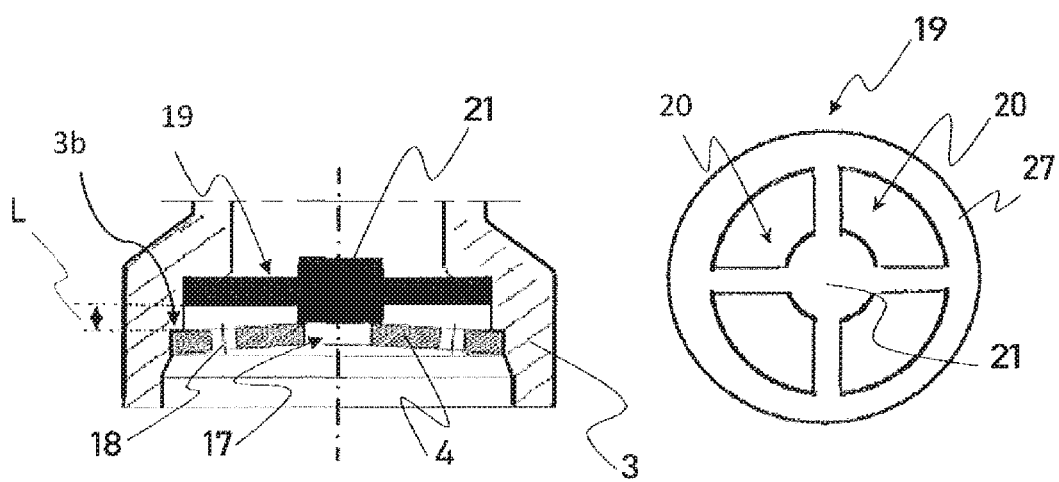
FIG. 5A shows a cross-sectional view of a further embodiment of the inflator according to the present invention.
FIG. 5B shows a schematic top view of the throttle member of FIG. 5A.

A further possible embodiment of the present invention is shown in FIGS. 5A, and 5B wherein a disc 19 having a flat shape is used as an abutment member in the exit duct 3 of the inflator 1. The disc 19 is firmly and transversely located in the exit duct 3 of the inflator 1 downstream of throttle member 4 at a distance L to allow a central area of throttle member 4 to contact the disc 19 when throttle member 4 is fully deformed by the driving force of the pressurized gas exiting inflator 1. The distance L between the upstream surface of the disc 19 and the downstream surface of the throttle member 10, when referred to the flow of the pressurized gas exiting said inflator, may be comprised between 1.0 and 4.0 mm. The disc 19 is made from a hard or semi-hard material and the area of the openings 20 is such as to let the gas flow through them without substantial reduction of the flow rate with respect to the flow through throttle member 4.

A plane view of disc 19 is shown in FIG. 5B; disc 19 is flat and has a cross shape with four wide void spaces (openings) 20 having substantially equal areas around a closed/filled central area 21 and inside a circular peripheral element 27. The closed/filled central area 21 of disc 19 has a central axis corresponding to the axis of the central opening 17, of throttle member 4. The disc 19 is located (see FIG. 5A) at such a distance L from throttle member 4 to allow said central area of throttle member 4 to contact the closed/filled central area 21 of disc 19 when throttle member 4 is fully deformed by the driving force of the pressurized gas exiting said inflator. When the inflator 1 is activated and a selected pressure is reached, throttle member 4 deforms under the driving force of the pressurized gas. Upon deformation, the central area of the throttle member, comprising central opening 17, may contact the closed central area 21 of disc 19 located in exit duct 3 of the inflator 1, downstream of said throttle member 4, causing the blocking of the gas flow through central opening 17 of throttle member 4, while allowing the passage of the gas flow through the side openings 18 of throttle member 4.

Due to the presence of four void spaces (openings) 20 in the disc 19, and the fact that the side openings 18 of throttle member 4 are not obstructed, there is a free passage through openings 20 of disc 19 for the pressurised gas exiting vessel 2 of the inflator. Disc 19 provides an at least partial obstruction of the central opening 18 of throttle member 4.

As a further variation of the shape of the abutment member, i.e. disc 19, shown in FIGS. 5A and 5B, the abutment member may also have a three dimensional shape. In particular, this three-dimensional abutment member 29 is shown in FIGS. 7-9.

Figures 7A, 7B, 7C:
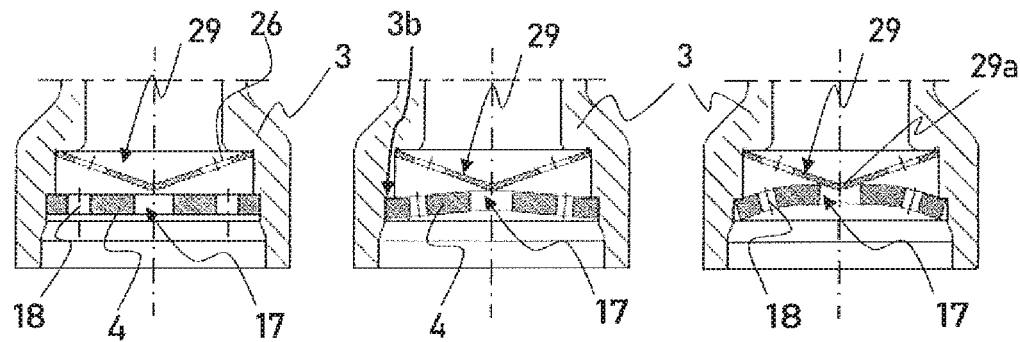
FIGS. 7A, 7B and 7C are enlarged fragmentary longitudinal sectional views of a portion of the exit duct of an inflator according to a further possible embodiment of the present invention.

The abutment member shown in FIGS. 7A, 7B and 7C has a substantially convex or conical shape having a vertex upstream with respect to the flow of the gas. Abutment member 29 can co-operate with throttle member 4 that deforms under the driving force of the gas exiting from the inflator 1. FIG. 7A shows the abutment member 29 and throttle member 4 in a not operative condition of the inflator 1, wherein the vertex 29a of the conically shaped abutment member 29 is spaced from the flat throttle member 4. Abutment member 29 has a closed/filled central area and side openings 26.

FIGS. 7B and 7C show the effect of the driving force of the gas exiting the inflator 1, i.e. a deformation of throttle member 4 towards the abutment member 29. As previously discussed, the deformation of the throttle member and formation of a concavity in the throttle member, may occur in different degrees according to the pressure P of the gas flow, which depends on the temperature. In FIG. 7B it is shown the deformation occurring when the pressure is such as to only partially deform throttle 4; in this second position the throttle is deformed into a concave shape, with respect to the direction of the gas in such a manner that central opening 17 of throttle member 4 is becoming closed or obstructed by the tapered portion around the vertex of the conically shaped abutment member 29, while the pressurised gas can flow through the side openings of the throttle member 18 and the side openings of the abutment member 26.

Figures 8A, 8B, 8C:
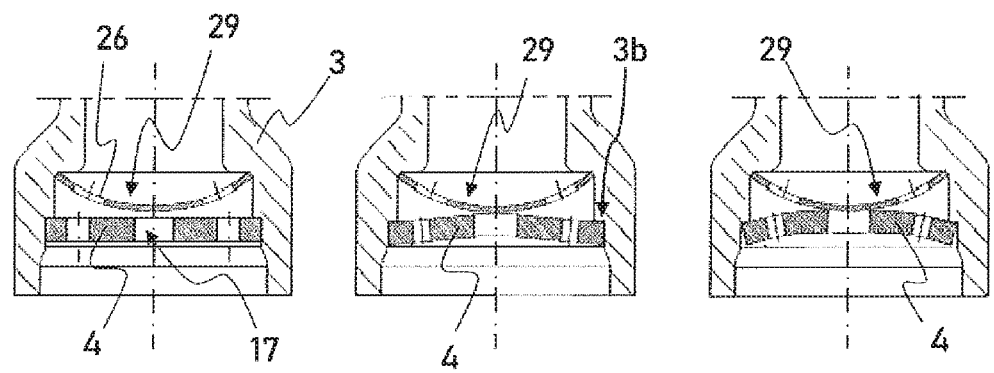
FIGS. 8A, 8B and 8C are enlarged fragmentary longitudinal sectional views of a portion of the exit duct of an inflator according to a further possible embodiment of the present invention.

The abutment member 29 shown in FIGS. 8A, 8B and 8C has a curved or arched shape and comprises a closed/filled central area and side openings 26; the same parts of the device are identified by identical reference numbers. The functioning of the device is identical to the functioning of the device of FIGS. 7A-7C.

Figures 9A, 9B, 9C:
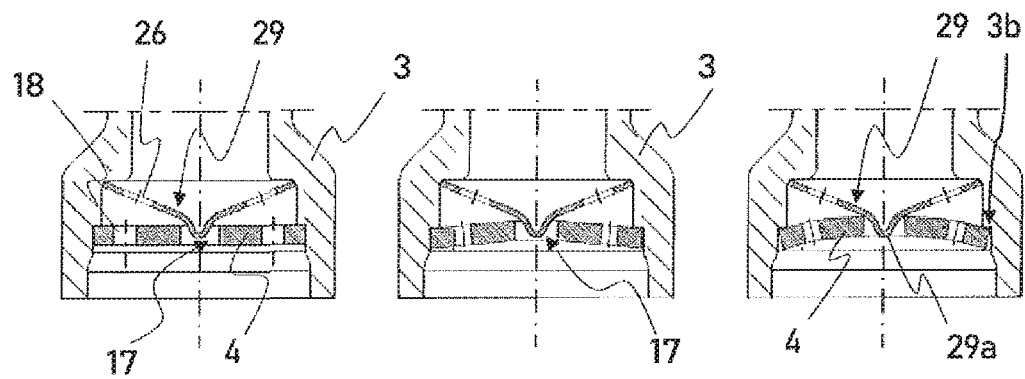
FIGS. 9A, 9B and 9C are enlarged fragmentary longitudinal sectional views of a portion of the exit duct of an inflator according to a further possible embodiment of the present invention.

The abutment member 29 shown in FIGS. 9A, 9B and 9C has a conical shape provided with a protruding and rounded vertex 29a which is closed or filled. Said protruding vertex is shaped in such a manner that it may engage and possibly penetrate into central opening 17 of throttle member 4 when throttle member 4 is deformed under the driving force of the gas exiting inflator 1 as shown in FIG. 9B and FIG. 9C. This particular three-dimensional shape of abutment member 29 allows a partial closure or a substantially complete closure of central opening 17 of throttle member 4, while permitting the passage of the pressurised gas flow through the side openings 18 of throttle member 4 and the side openings 26 of abutment member 29 of the throttle valve. The side openings 18 of throttle member 4 are not obstructed or closed by abutment member 29. The functioning of the device is substantially identical to the functioning of the device of FIGS. 7A-7C.

Figure 10A:
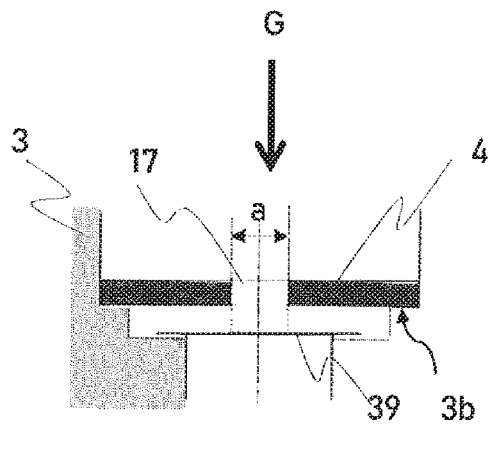
FIGS. 10A and 10B are schematic fragmentary longitudinal sectional views of a portion of the exit duct of the inflator according to a further possible embodiment of the present invention.
Figure 10B:
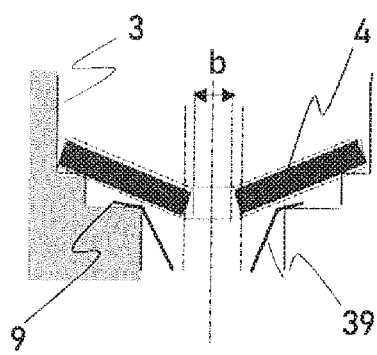

According to a further possible embodiment of the present invention, shown in FIGS. 10A and 10B, throttle member 4 has only one opening 17, which is centrally located and has an initial diameter "a". FIG. 10A shows throttle member 4 before the inflator is activated, while FIG. 10B shows deformed and concave throttle member 4 after the inflator is activated, with a gas pressure high enough to fully deform the throttle member against abutment shoulder 9. The gas inlet area of the opening 17 changes with the deformation of the throttle member into an opening with diameter "b", which is smaller than initial diameter "a". The flow rate of the gas through "b" is lower than through "a", thus achieving the effect of controlling the pressure downstream the throttle valve of the invention. As in the previously disclosed embodiments, the degree of deformation of the throttle member may depend on the pressure P of the gas.

Figure 11A:
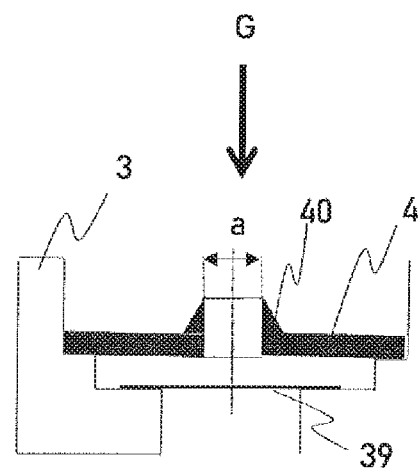
FIGS. 11A and 11B are schematic fragmentary longitudinal sectional views of a portion of the exit duct of the inflator according to a further possible embodiment of the present invention.
Figure 11B:
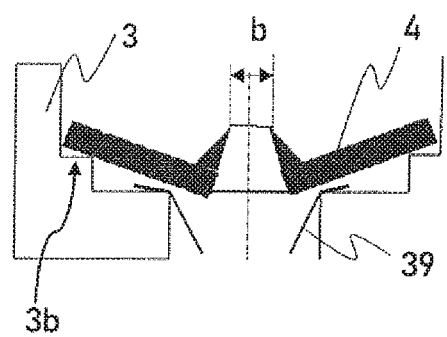

The throttle member shown in FIGS. 11A and 11B differs from that of FIGS. 10A and 10B in that the side of throttle member 4, which faces in the direction opposed to the gas flow G from the pressurised vessel, has a reinforced area 40 around its central opening 17, wherein the material of throttle member 4 has a greater thickness with respect to the thickness of the adjacent areas of the throttle member. Said reinforced area 40 forms a projection around said central opening 17. FIG. 11A shows throttle member 4 before the inflator is activated, while FIG. 11B shows the deformed throttle member after the inflator is activated.

In both embodiments shown in FIGS. 10 and 11, the throttle valve operates in the same way. In particular, FIGS. 10A and 11A show the throttle member in an unstressed condition, when the inflator 1 is in a not operative condition, thus no force is exerted onto the surface of the throttle member. When the inflator is activated, pressurised gas flow G urges the flexible or deformable throttle member 4 towards an abutment member 39 and as a result throttle member 4 deforms and the abutment member 39 breaks, allowing thereby the exit of the gas G from the inflator 1 as shown in FIGS. 10B and 11B. During the deformation of the throttle member 4 under the driving force of the gas G, also the central opening 17 deforms in such a way to obtain a partial reduction of the central opening to have the diameter "b", i.e. the diameter "b" of the central opening 17 after deformation is less than the diameter "a" before the inflator activation, i.e. b<a. The deformation of the central opening is much more evident if there is a reinforced area 40, i.e. an area with an increased thickness, around the central opening 17 in the throttle member as shown in FIG. 11A and FIG. 11B. In both embodiments shown in FIGS. 10 and 11, the deformation of the central opening 17 of the deformed throttle member 4 causes a reduction of gas flow through said opening, wherein said reduction is the function of the thickness of the material of the throttle member or the thickness of said reinforced area around the opening of the throttle member.

Figure 4A:
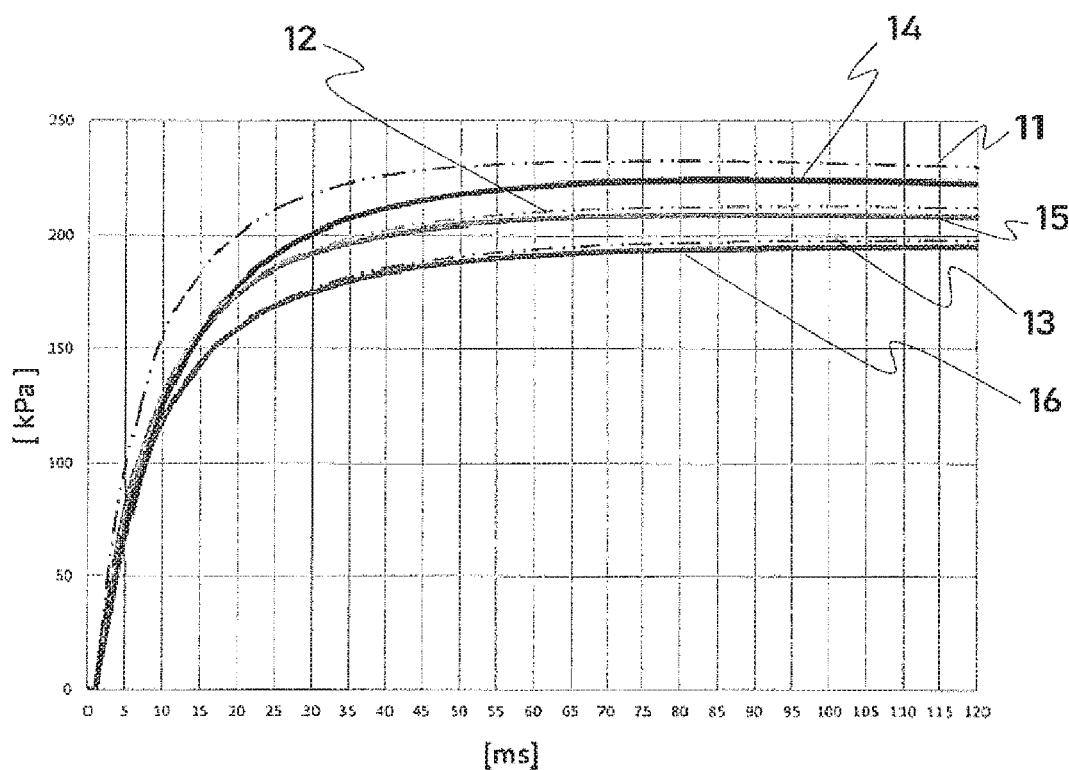
FIGS. 4A and 4B show charts of hot, cold and ambient pressure vs. time curves, registered with an inflator having a standard prior art gas flow throttle, compared to the same inflator using a throttle member of the invention.
Figure 4B:
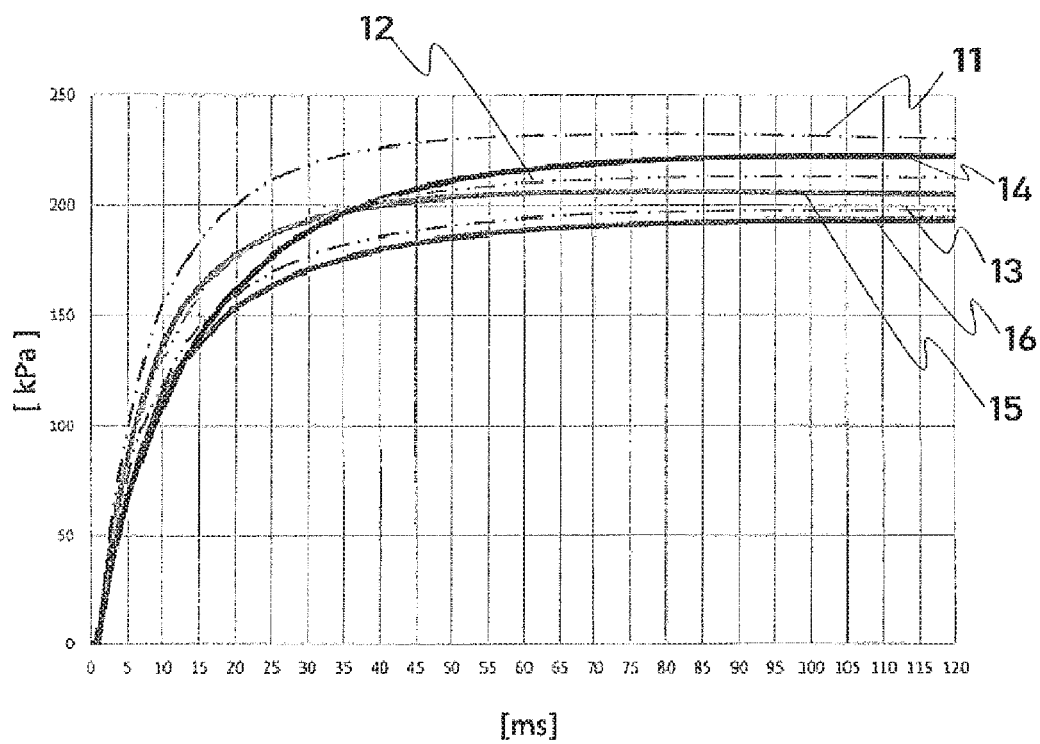

The charts shown in FIG. 4 are the result of comparative tests carried out with an inflator according to the known art in comparison with the same inflator but provided with a throttle member according to the present invention. The prior art inflator has a duct 3 without a throttle, the inflator of the invention has a throttle that, in a not-deformed condition, provides the same fluidic resistance as the duct 3 of the prior art inflator. The total amount of free area in the throttle available for gas passage is the same in the two ducts. The abutment member of the inflator 1 was a shoulder 9 provided in the exit duct 3, according to the embodiment shown in FIGS. 3A-3B. The throttle member used in the comparative tests was steel C30 HV10 130-135 and it was cut from a steel sheet having a thickness of 1.85 mm; the throttle had one central opening and four peripheral openings with a ratio area of central opening/area of peripheral openings of 39/61. The distance (h) between downstream surface of the throttle element 10 and the shoulder 9 was 1.2 mm. The pressure profiles obtained by the comparative tests are shown in the charts of FIGS. 4a and 4b.

The charts of FIGS. 4A and 4B represent the trend of gas pressure at the exit duct downstream the throttle, as a function of time in case of deployment of an airbag by means of pressurised gas stored at hot temperature, i.e. at 85° C., ambient temperature, i.e. 25° C., and at cold temperature, i.e. at −35° C. The gas pressure in the vessel at 85° C. was 737 bar, at 25° C. it was 613 bar and at −35° C. it was 495 bar.

The dotted lines 11, 12, 13 refer to the pressures measured at different time intervals by using the standard known inflator at hot temperature, line 11, at room temperature, line 12 and at cold temperature, line 13. The continuous lines 14, 15, 16 refer to the pressures measured at different time intervals by using an inflator of the present invention at hot temperature (85° C.) line 14, at room temperature (line 15, 25° C.) and at cold temperature (line 16, −35° C.). The continuous lines 14, 15, 16 of the chart diagram of FIG. 4a indicate the pressure measured at different time intervals by using the above disclosed inflator of the invention, wherein throttle member 4 has a central opening 17 with a diameter of 3.5 mm and a distance H of 1.2 mm between the downstream surface 4b of the throttle member and the surface of the abutment shoulder 9 in the exit duct 3. The ratio area of central opening/area of peripheral openings was 39/61. Continuous line 14 showing the trend of the gas pressure in function of time at hot temperature (+85° C.), clearly indicates a better inflator performance, i.e. a significantly lower exit pressure, with respect to that of the standard known inflator shown by dotted line 11 where the gas exits from the inflator at a higher pressure into the airbag.

Notably, the performance of the inflator of the present invention at 85° C. substantially corresponds to the initial performance (in the first 10-20 msec) of the same inflator at 25° C., as well as to that of the standard known inflator at 25° C., i.e. at room temperature. Consequently, the inflator of the present invention minimises the difference of the ramp slope at high temperature with respect to the ramp slope at ambient temperature, i.e. at 25° C. This means that in the initial phase of the airbag deployment, i.e. up to about 20 ms from the activation of the inflator, the hot gas enters into the airbag at a flow rate which is similar to that achievable by the pressurised gas at ambient pressure. The pressure-time curves of this chart show the improved performance of the inflator of the present invention in comparison to the standard known inflator in case of gas stored at hot temperature in the vessel of the inflator.

The chart diagram of FIG. 4b was established in the same conditions used in the comparative test shown in FIG. 4a, with the difference that the inflator of the present invention had a throttle member in which the central opening 17 had a diameter of 3.6 mm and distance H of 1.0 mm between the downstream surface of the throttle member 10 and the surface of the bottom shoulder in exit duct 3. The ratio area of central opening/area of peripheral openings was 45/55. In this comparative test a better performance was achieved with the inflator of the present invention in comparison to the standard known inflator. The continuous line 14, showing the trend of the gas pressure at hot temperature (85° C.), indicates that the inflator of the present invention in this configuration can achieve a hot gas initial pressure much lower than that obtainable with the standard known inflator as registered by dotted line 11.

Since the initial phase of the deployment of the airbag, which is up to about 20 milliseconds after the activation of the inflator, is very crucial as to the possible damaging of the airbag or trim components of the vehicle during employment, the hot deployment is carried out at a reduced pressure ramp as evidenced by continuous line 14 in FIG. 4b with respect to the hot deployment with the standard known inflator as shown by dotted line 11.

The comparative test results shown by the chart diagrams of FIG. 4a and FIG. 4b demonstrate that, in comparison to the known standard inflator, the inflator of the present invention has a significantly better performance in case of gas stored at hot temperature, i.e. at high pressure, while it has still a good performance at room temperature and at cold temperature.

With the foregoing description of the invention, those skilled in the art will appreciate that modifications may be made to the invention without departing from the spirit thereof. Therefore, it is not intended that the scope of the invention be limited to the specific embodiments illustrated and described.

The invention claimed is:

1. A gas generator including means to provide a pressurized gas, a gas exit portion, a throttle member located in said gas exit portion, wherein the throttle member comprises a plurality of openings for the passage of said gas and is made of a material which is deformable by said gas flowing through said throttle member when the pressure of said gas is above a predetermined pressure, said throttle member being deformable from a first position in which said gas can flow through said plurality of openings of the throttle member into at least one second position in which gas flow is prevented or reduced through at least part of said plurality of openings, wherein in one of said first and second positions at least part of said throttle member has a concave shape;
   wherein at least one of said plurality of openings being located centrally to said throttle member;
   further comprising an abutment portion for said throttle member, said abutment portion being located in said exit portion of the gas generator, downstream of said throttle member with respect to the direction of the gas flow and wherein a gas flow through a part of said plurality of openings is prevented or reduced by said abutment portion when the throttle member has been deformed;
   wherein said abutment portion is a disc provided with a closed central area, said disc is located downstream of said throttle member with respect to the direction of the gas flow and is spaced from said throttle member at a distance such that it can be contacted by said throttle member when it is deformed;
   wherein when said throttle member is in the second position, said central opening of said throttle member abuts said closed central area of said disc, thereby preventing said gas flow through said central opening.

2. The gas generator according to claim 1, wherein said gas exit portion comprises a duct having a housing for said throttle member, said housing supports said throttle member along its peripheral edge.

3. The gas generator according to claim 1, wherein said gas generator is an airbag inflator selected from a cold gas inflator and a hybrid inflator.

4. An airbag assembly including said inflator according to claim 3.

5. The airbag assembly according to claim 4, wherein said airbag is a curtain airbag.

6. A gas generator including means to provide a pressurized gas, a gas exit portion, a throttle member located in said gas exit portion, wherein the throttle member comprises one or more openings for the passage of said gas and is made of a material which is deformable by said gas flowing through said throttle member when the pressure of said gas is above a predetermined pressure, said throttle member being deformable from a first position in which gas can flow through said one or more openings of the throttle member into at least one second position in which gas flow is prevented or reduced through said at least part of said one or more openings, wherein in one of said first and second positions at least part of said throttle member has a concave shape, wherein the throttle member comprises one opening, said opening being deformable by gas pressure from a first position into a second position in which an inlet area of said opening in said second position is less than an inlet area of the opening in said first position, whereby gas flow is reduced through said opening.

7. The gas generator according to claim 6, wherein an area around said opening has a thickness greater than the adjacent areas of the throttle member.

8. A method of controlling the gas flow from a gas generator, wherein said gas flow is directed through a throttle member comprising at least one opening, said throttle member being deformable from a first position in which gas can flow through said at least one opening of the throttle member and a second position in which gas flow through said at least one opening is reduced, wherein deformation of said throttle member occurs when the pressure of the gas from said gas generator is above a predetermined value;
   wherein the at least one opening in said first position is greater than the at least one opening in the second position.

9. The method according to claim 8, wherein the amount of deformation of said throttle member depends on the pressure of said gas.

10. The method according to claim 9, wherein said predetermined value of pressure is the pressure of the gas in said gas generator when said gas generator is held at temperature of 20° C. or more, whereby said throttle member is deformed to restrict a flow of gas coming from said gas generator.

11. The method according to claim 10, wherein said gas generator includes a gas exit portion comprising a duct having a housing for said throttle member, said housing supports said throttle member along a peripheral edge.

12. The method according to claim 8, wherein said predetermined value of pressure is the pressure of the gas in said gas generator when said gas generator is held at temperature of 20° C. or more, whereby said throttle member is deformed to restrict a flow of gas coming from said gas generator.

13. The method according to claim 8, wherein said gas generator includes a gas exit portion comprising a duct having a housing for said throttle member, said housing supports said throttle member along a peripheral edge.

* * * * *